United States Patent
Fornara et al.

(10) Patent No.: US 9,580,616 B2
(45) Date of Patent: *Feb. 28, 2017

(54) DISPERSANTS

(75) Inventors: Dario Fornara, Novara (IT); Alan Nappa, Modena (IT); Tamara Verzotti, Bellinzago (IT); Paolo Prampolini, Castelnuovo Rangone (IT); Stefano Crespi, Busto Arsizio (IT); Giovanni Floridi, Novara (IT); Giuseppe Li Bassi, Gavirate (IT)

(73) Assignee: LAMBERTI SPA, Albizzate (VA) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/984,711

(22) PCT Filed: Feb. 6, 2012

(86) PCT No.: PCT/EP2012/051923
§ 371 (c)(1),
(2), (4) Date: Aug. 9, 2013

(87) PCT Pub. No.: WO2012/107379
PCT Pub. Date: Aug. 16, 2012

(65) Prior Publication Data
US 2013/0312636 A1 Nov. 28, 2013

(30) Foreign Application Priority Data
Feb. 10, 2011 (IT) .............. VA2011A0003

(51) Int. Cl.
| | | |
|---|---|---|
| C08K 5/15 | (2006.01) |
| C07C 211/00 | (2006.01) |
| B32B 7/12 | (2006.01) |
| C09D 11/00 | (2014.01) |
| C07D 295/18 | (2006.01) |
| C07C 53/00 | (2006.01) |
| C07C 213/00 | (2006.01) |
| C07C 217/00 | (2006.01) |
| C09D 11/38 | (2014.01) |
| C04B 41/00 | (2006.01) |
| C04B 41/45 | (2006.01) |
| C04B 41/81 | (2006.01) |
| C08G 73/02 | (2006.01) |
| C09D 11/326 | (2014.01) |
| C09D 7/02 | (2006.01) |
| C08L 79/02 | (2006.01) |

(52) U.S. Cl.
CPC ............ C09D 11/38 (2013.01); C04B 41/009 (2013.01); C04B 41/4539 (2013.01); C04B 41/81 (2013.01); C08G 73/024 (2013.01); C09D 7/02 (2013.01); C09D 11/326 (2013.01); C08L 79/02 (2013.01)

(58) Field of Classification Search
None
See application file for complete search history.

(56) References Cited

U.S. PATENT DOCUMENTS

| | | | |
|---|---|---|---|
| 3,643,007 A | 2/1972 | Roberts et al. |
| 4,224,212 A | 9/1980 | Topham |
| 7,214,653 B2 | 5/2007 | Yoneda et al. |
| 2003/0181544 A1 | 9/2003 | Thetford et al. |
| 2008/0103234 A1* | 5/2008 | Thetford .................. 524/107 |
| 2009/0131555 A1 | 5/2009 | Thetford |

FOREIGN PATENT DOCUMENTS

| | | |
|---|---|---|
| EP | 154678 A1 | 9/1985 |
| EP | 158406 A1 | 10/1985 |
| EP | 0438836 A1 | 7/1991 |
| EP | 0958041 A1 | 5/1998 |
| EP | 0208041 A1 | 7/2001 |
| EP | 1648970 A2 | 3/2005 |
| EP | 1911813 A1 | 4/2008 |
| EP | 1911815 A1 | 4/2008 |
| GB | 1508576 | 4/1978 |
| GB | 2108143 | 5/1983 |
| JP | 6312335 | 1/1988 |
| JP | 248029 | 2/1990 |
| WO | 2004104064 A2 | 12/2004 |
| WO | 2008070601 A2 | 6/2008 |
| WO | 2009148836 A1 | 12/2009 |

OTHER PUBLICATIONS

Derwent English Abstract, Kawa et al. JP 2-48029, 14 pages.*

* cited by examiner

Primary Examiner — Susannah Chung
Assistant Examiner — Robert T Butcher
(74) Attorney, Agent, or Firm — Mossman, Kumar & Tyler, PC

(57) ABSTRACT

Compound of Formula (1); wherein: $Z^w$ is an organic radical comprising w amino groups, in which w is a number and $5 \leq w \leq 3,000$; A and B are independently oxy-$C_1$-$C_{20}$-alkylene carbonyl groups or oxy-$C_2$-$C_{20}$-alkenylene carbonyl groups derived from hydroxy carboxylic acids or lactones; T is hydrogen or R—CO—, where R is a $C_1$-$C_{50}$ hydrocarbyl group; Y is a $C_3$-$C_4$-alkylene radical linked to an amino group of $Z^w$; Y' is an ionic salt link between an amino group of $Z^w$ and the terminal carbonyl of $(A)_r$-$(B)_p$-T; r and p are independently numbers between 0 and 50 and $r+p>2$; s, m and v are numbers; $0.99w \leq s+m \leq 2w$; and $0.3w \leq s+v \leq 2w$ are suitable as dispersants and milling aids.

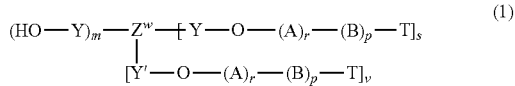

20 Claims, No Drawings

DISPERSANTS

FIELD OF THE INVENTION

The present invention relates to compounds suitable as dispersants, milling aids and dispersion stabilizers.

The invention further relates to processes for preparing these compounds and to their use as dispersants, milling aids and dispersion stabilizers for organic and inorganic pigments and for fillers for organic systems.

BACKGROUND OF THE ART

In order to be able to incorporate solids into liquid media, high mechanical force is necessary. It is usual to use dispersants in order to lower the dispersing forces and in order to minimize the total input into the system of energy needed to deflocculate the particulate solids and hence to minimize the dispersing time. Dispersants of this kind are surface-active substances of anionic, cationic or neutral structure. These substances, in a small amount, are either added to the dispersing medium or applied directly to the solid. It is also known that, following complete de-flocculation of the agglomerated solids into primary particles, after the dispersing operation, there are also instances of re-agglomeration, thereby completely or partly nullifying the dispersing effort. As a consequence of the inadequate dispersing and/or as a result of re-agglomeration there are unwanted effects: viscosity increase in liquid systems, shade drift, losses of gloss in paints and coatings, and the reduction of mechanical strength in plastics. Different formulations of inks require the use of effective dispersants for uniformly distributing the pigments in an organic medium and for minimizing the re-agglomeration that can occur during storage: inadequate dispersing manifests itself as increased viscosity in liquid systems, loss of brilliance and/or hue shifts. In particular in inks for ink-jet systems, particularly good dispersion of the pigment particles is required to ensure unimpeded passage of the pigment particles through the nozzles of the print-head in the ink jet printer, which are usually only a few micrometers in diameter. In addition, pigment particle agglomeration and the associated blockage of the printer nozzles has to be avoided in the standby periods of the printer. In special applications, such as decoration of ceramic by inkjet printing, the characteristics of the dispersants are very challenging because they need stabilization of inorganic pigments with high specific weight, in concentrated formulations that must have low viscosity (i.e. 8-30 mPa·s) and small particle size (<1 μm).

A multiplicity of different substances are nowadays used as dispersants for pigments and fillers. Besides simple compounds of low molecular mass, such as lecithin, fatty acids and their salts, and alkylphenol ethoxylates, complex structures are used as dispersants. These dispersants are mainly based on polymeric structures derived from oligo- or polyamines reacted with polyesters or polyethers, or from polyurethanes and polyisocyanates.

Many polymeric dispersants contain in one part of the molecule the so-called anchor group, which adsorbs onto the pigments to be dispersed. In a spatially separated part of the molecule, polymeric dispersants have polymer chains sticking out whereby pigment particles are made compatible with the dispersion medium, i.e. stabilized. The properties of polymeric dispersants depend on both the nature and the monomers and their distribution in the polymer. Polymeric dispersants obtained by statistically polymerization of monomers or by polymerizing alternating monomers generally result in poor dispersion stability. Improvements in dispersion activity are obtained using graft copolymer dispersants.

Graft copolymer dispersants which contain a back-bone based on poly(alkylene)imine and polyester chain moieties derived from one or more hydroxycarboxylic acids or lactones thereof have been known for a long time. In EP 158 406 and EP 208 041 use is made of amino and amide-functional polymers and oligomers based on polyamines and homo-polycaprolactones, in which most of the reactive amino groups have been converted into amide groups, to provide polymers and oligomers comprising a mixture of salt and amide groups. The polyesters are not terminated or contain a terminal alkylcarbonyl-group. In this case the polyester can be obtained by polymerization of an hydroxy-carboxylic acid or lactone thereof in the presence of an alkylcarboxylic acid as polymerizing terminating group to give a polyester chain having only a free carboxylic acid. These dispersants are claimed to be particularly effective in more polar medium such as ketones and esters, but they have limited performance in non-polar medium; in any case their solubility is somewhat limited particularly at temperature below the normal ambient temperature.

The dispersants reported in U.S. Pat. No. 4,224,212 are the reaction products of polyethyleneimine and a polyester terminated by a carboxylic acid group, the preferred polyester being derived from hydroxycarboxylic acids having from 8 to 14 carbon atoms between the carboxylic acid group and the hydroxy group, for example from ricinoleic acid or from 12-hydroxystearic acid. The dispersants are claimed to be effective in non-polar medium, such as aliphatic solvents, however they have limited performance in polar mediums. The properties of such dispersants are claimed to be improved by branching the alkylene group of the polyester chain (EP 958041) or by using polymerization terminating groups containing branched aliphatic chain (US 2003/181544).

EP 1911813 and EP 1911815 describe non aqueous inkjet inks in which the molar percentage of amide groups based on the total nitrogen content of the polymeric dispersant is important for the formulation of a stable inkjet ink formulation.

Polymeric dispersants based on polyisocyanates or polyurethanes are also widely described, for example in EP 154 678, EP 438 836, WO 2004/104064, WO 2008/070601 and WO 2009/148836.

Few patents discloses the combination of polyalkylenimine reacted with epoxides to obtain hydroxyalkylated polyalkylenimine and further grafted with other polymers. US 2009/0131555 describes a dispersant based on a poly-alkylenoxyamine linked to a poly(lower alkylene)imine by a dibasic acid. This dispersant is claimed to be suitable to disperse particulate solid in polar organic media and water. U.S. Pat. No. 7,214,653 discloses products based on a polyalkylenimine alkyleneoxide copolymer wherein the polyalkyleneoxide is constituted on average of at least of 2 oxyalkylene repeating unit (preferentially oxyethylene) having different terminal groups to modulate the characteristics of the product. The products of the invention can be suitably used as builders for detergent, as detergents, as water treatment agents and as dispersants.

At last, JP 248029 and JP 6312335 describe dispersing agents obtained by reacting polyethylenimines with epoxides to partially block the amine groups in the polyethylenimine and then by reacting the obtained products with polyesters from hydroxystearic acid or copolymers based on ε-caprolactone and hydroxystearic acid, terminated with a carboxylic acid group. Up to 1 part by weight of epoxide may be reacted with 1 part by weight of polyethyleneimine, which means that the equivalent of epoxides are lower than the equivalent of nitrogen atoms in the polyethylenimine; the polyesters are said to make an amide or salt linkage with the polyethylenimine. The reaction of the polyethylenimine with epoxides is said to avoid the release of odor from the decomposition of the primary amine groups of the polyethylenimine or from the low molecular weight oligoamines present in polyethyleneimine.

In general, in dispersants based on polyalkyleneimine, most of the amine groups are amidated or salified by reaction with polyesters; fewer products are based on polyalkyleneimine linked to aminopolyethers (in general from ethylene and/or propylene oxide) by an anhydride (EP 1648970).

Due to the transformation in amides or salts, the amino groups of the polyalkyleneimine lose basicity.

The dispersants presented above often represent only partial solutions to the problems of dispersion and stabilization. In view of the multiplicity of organic and inorganic pigments and filling materials that are used today, sufficient stabilization of the particulate solids to be dispersed, by desorption-stable occupancy of the surface, is not adequately ensured. This is particularly evident in special applications, such as in decoration of ceramic by inkjet printing, where the stabilization of inorganic pigments with high specific weight in concentrated formulations that must have low viscosity and small particle size, is required.

The present invention is therefore based on novel structures designed to eliminate the above-described disadvantages of known dispersants, in other words on developing dispersing additives which, while effectively stabilizing pigments or fillers, lower the millbase viscosity of inks, paints, pastes or plastics formulations to an extent such that processing with a high degree of filling is possible.

Surprisingly, it has become apparent that a marked improvement in the stabilization of pigments or filler particles in inks, pigment pastes, binders, or plastics formulations can be achieved when the addition compounds prepared from polyalkyleneimines, reacted with about one mole of alkylene oxide per nitrogen atom and further reacted with polyesters, are used. These dispersants strongly low the energy required for preparing millbases with suitable particle size for inkjet inks, reducing viscosity during dispersing and milling. Moreover they keep an excellent long term stability, making it possible to prepare stable formulations having a high solids fraction and low viscosity. This class of dispersant has characteristics very favorable to the preparation of ink-jet inks for ceramic decoration.

SUMMARY OF THE INVENTION

According to the present invention there is provided a class of dispersants represented by formula (1)

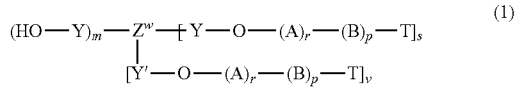

wherein:

$Z^w$ is an organic radical comprising w amino groups, in which w is a number and $5 \leq w \leq 3,000$;

A and B are independently oxy-$C_1$-$C_{20}$-alkylene carbonyl groups or oxy-$C_2$-$C_{20}$-alkenylene carbonyl groups derived from hydroxycarboxylic acids or lactones;

T is hydrogen or R—CO—, where R is a $C_1$-$C_{50}$ hydrocarbyl group;

Y is a $C_3$-$C_4$-alkylene radical linked to an amino group of $Z^w$;

Y' is an ionic salt link between an amino group of $Z^w$ and the terminal carbonyl of $(A)_r$-$(B)_p$-T;

r and p are independently numbers between 0 and 50 and r+p>2;

s, m and v are numbers;

$0.99w \leq s+m \leq 2w$;

and $0.3w \leq s+v \leq 2w$.

In another aspect, the invention is a liquid composition comprising from 5 to 95% by weight of a particulate solid and from 0.5% to 100% by weight, based on the particulate solid, of the above compound of formula (1).

DETAILED DESCRIPTION OF THE INVENTION

The present invention provides a class of dispersants as described above.

In formula (1) $Z^w$ is the residue of polyamine or polyimine. Polyimine is poly($C_{2-6}$-alkyleneimine) and or polyethyleneimine (hereinafter PEI). Preferably $Z^w$ is the residue of a polyethyleneimine. The polyethyleneimine may be linear or branched. Linear polyalkylenenimines may be prepared by hydrolysis of poly(N-acyl)alkyleneimine (T. Saegusa et al. in Macromolecules, 1972, 5, 4470). Branched polyethyleneimines of different molecular weights are commercially available from BASF and Nihon Shokubai. Polyallylamine and poly-(N-alkyl)allylamines of differing molecular weights are commercially available from Nitto Boseki. Poly(propyleneimine)dendrimers are commercially available from DSM Fine Chemicals. The number molecular weight of the polyamines or polyimines preferably ranges from 500 to 60,000, more preferably from 1,000 to 50,000, even more preferably from 1,000 to 30,000.

To obtain the dispersant of the invention, the polyimine or polyamine $Z^w$ is reacted with from about 1 mole to about 2 moles of an epoxide per N atom, preferably with from 1 to 1.2 moles of epoxide per N atom, to obtain a fully epoxidized polyimine, that can be further reacted with a —CO—OH terminated polyester (HO-$(A)_r$-$(B)_p$-T) to give compound of formula (1) in which s+m is between 0.99w and 2w, preferably between 0.99w and 1.2w.

By "fully epoxidized polyimine" we mean a polyimine in which basically all of the amino groups have reacted with the epoxide, that in formula (1) originates the alkylene radical Y.

The epoxide may be propylene oxide, butylene oxide or higher epoxide, and preferably it is propylene oxide; examples of Y groups are 2-methylethylene radicals (—(CH$_3$)CH—CH$_2$—) and 2-ethylethylene radicals; preferably Y is a 2-methylethylene radical.

In the preferred embodiment, there is statistically one Y group for each secondary amine nitrogen in $Z^w$ and two Y group for each primary amine nitrogen group. "Statistically" means that in some cases some NH groups may still be present in the molecule of the alkoxylated polyimine. The dispersants according to the invention are typically polymers obtained from polyesters, eventually acid terminated, linked to a statistically fully epoxidized polyamine $Z^w$ a) by a covalent ester link through Y, and/or b) by an ionic salt linkage on N of polyethyleneimine. As it is possible that the statistically fully epoxidized polyimine contains some free NH groups it is possible the minor presence of amidic linkages between the polyester and the statistically fully epoxidized polyethyleneimine. As the dispersant may contain two or more polyester chains, it may contain a mixture of ester, and/or salt linkages. The formation of covalent linkages or ionic linkage is dependent on the reaction conditions used in its preparation.

In formula (1), s+v is between 0.3w and 2w, and preferably between 0.5w and w+2.

According to a preferred embodiment, the dispersants are polymers obtained from polyesters, acid terminated, prevalently linked to a statistically fully epoxidized polyimine $Z^w$ by covalent ester links, i.e. v=0.

In another embodiment, the dispersants are polymers obtained from polyesters, acid terminated, prevalently linked to a statistically fully epoxidized polimine $Z^w$ by a ionic salt linkage, i.e s=0.

Different polyester chains may be attached to $Z^w$ through Y and/or Y'.

Y' is formed from the salification of the carboxylic acid group of the polyester HO-(A)$_r$-(B)$_p$-T with an amino group of $Z^w$.

The hydroxycarboxylic acids from which A and B are independently derived, are hydroxy-$C_{1-20}$-alkylene carboxylic acids or hydroxy-$C_{2-20}$-alkenylene carboxylic acids, i.e. A and B are independently oxy-$C_{1-20}$-alkylene carbonyl groups or oxy-$C_{2-20}$-alkenylene carbonyl groups. The alk(en)ylene group may be linear or branched. Examples of hydroxycarboxylic acids are ricinoleic acid, 12-hydroxystearic acid, 12-hydroxydodecanoic acid, 5-hydroxydodecanoic acid, 10-hydroxyundecanoic acid, 5-hydroxydecanoic acid, 4-hydroxydecanoic acid, 6-hydroxycaproic acid, 5-hydroxyvaleric acid, lactic acid and glycolic acid. A and B may be independently derived from lactones. Examples of suitable lactones are β-propriolactone, ε-caprolactone or alkylsubstituted ε-caprolactone, δ-valerolactone or alkylsubstituted δ-valerolactone. Alkyl substituent in ε-caprolactone and δ-valerolactone includes a $C_{1-6}$-alkyl and may be linear or branched. Suitable examples of lactones are ε-caprolactone and the 7-methyl, 3-methyl, 5-methyl, 6-methyl, 4-methyl, 5-tertbutyl, 4,4,6-trimethyl and 4,6,6-trimethyl analogues thereof. Mixtures of hydroxycarboxylic acids and/or lactones may be used. The choice of the terminating R—COOH and the hydroxycarboxylic acid or lactone may vary over wide limits and depends on the nature of the particulate solid and the organic medium.

Where the organic medium is non-polar, the hydroxycarboxylic acid often contains not less than 8 carbon atoms excluding the COOH group. Useful dispersants can be obtained from ricinoleic acid, 12-hydroxystearic acid, 12-hydroxydodecanoic acid, 5-hydroxydodecanoic acid, 10-hydroxyundecanoic acid, 5-hydroxydecanoic acid, 4-hydroxydecanoic acid. In the case of non-polar organic media, these hydroxycarboxylic acids may also be mixed with hydroxycarboxylic acids which contain up to 6 carbon atoms excluding the COOFI group or lactones thereof.

Where the organic medium is polar, A and B are independently derivable from hydroxycarboxylic acids which contain up to 6 carbon atoms excluding the COOH group or lactone thereof. Thus A and B are derivable from ε-caprolactone, $C_{1-6}$-alkyl substituted ε-caprolactone, $C_{1-6}$-alkyl substituted δ-valerolactone or δ-valerolactone itself.

In formula (1), r and p are independently numbers between 0 and 50 and r+p>2; preferably r+p>3. When r or p are 0 the polyester is a homopolyester, when both r and p are different from 0 the polyester is a copolyester.

In formula (1), T is hydrogen or a polymerization terminating group R—CO— which is the residue of a carboxylic acid R—COOH where R is a $C_1$-$C_{50}$ hydrocarbyl group. R may be aryl, aralkyl, eteroaryl, cycloalkyl or an alk(en)yl which may be linear or branched. When R is aryl it includes phenyl or naphthyl which is optionally substituted by $C_{1-20}$-alkyl, $C_{1-20}$-alkoxy, halogen, nitrile or phenoxy. Specific examples of R—COOH are benzoic acid or naphthalene-2-carboxylic acid. When R is aralkyl, it includes phenylacetic acid, naphthoxyacetic acid. When R is hetero-aryl, it may be thienyl. When R is cycloalkyl, it includes $C_{3-8}$-cycloalkyl such as cyclopropyl or cyclohexyl which is optionally substituted by one or more $C_{1-6}$-alkyl groups. When R is alkyl, it includes linear or branched moieties. Suitable examples of R—COOH are methoxyacetic acid, propionic acid, butyric acid, hexanoic acid, octanoic acid, lauric acid, dodecanoic acid, stearic acid, 2-ethylbutyric acid, 2-ethylexanoic acid, 2-butyloctanoic acid, 2-hexyldecanoic acid, 2-octyldodecanoic acid and 2-decyltetradecanoic acid. Branched alkyl carboxylic acid are also available under the trade mark Isocarb (ex Condea GmbH) and specific examples are Isocarb 12, 16, 20, 28, 32, 34T and 36; many of the carboxylic acids are commercially available as mixtures.

The dispersants are typically made by reacting preformed polyesters, acid terminated, with statistically fully epoxidized polyalkyleneimine. The reaction is carried out at temperature from 100° C. to 210° C., often in an inert atmosphere. The polyesters acid terminated are prepared at temperature from 50 to 250° C., optionally in the presence of a carboxylic acid R—COOH and optionally in the presence of an esterification catalyst. Preferentially the temperature is not less than 100° C. or not less than 150° C. In order to minimize any charring of the final product the temperature is generally not greater than 210° C. The inert atmosphere is provided by an inert gas, generally nitrogen. The esterification catalysts are well known to the people expert in the art and may be, for example, tin salt of an organic acid, for example dibutyl tin dilaurate, tetraalkyl titanate, for example tetrabutyltitanate, zinc salt of an organic acids, for example zinc acetate, zirconium salt of an aliphatic alcohol, for example zirconium isopropoxide or strong organic acid, for example toluenesulphonic acid, halo acetic acid, for example trifluoro acetic acid.

The reaction of polyimine or polyamine with epoxide is well known to the people expert in the art and is carried out at temperature from 90 to 170° C., in a stirred autoclave, by gradually adding the epoxide to the polyimine or polyamine. The epoxide addition rate is regulated in order to maintain the pressure in the autoclave between 1 and 4 bar. The quantity of epoxide to be reacted is calculated in order to obtain a statistically fully epoxidized polyalkyleneimine. Actually, by knowing the molecular structure and the molecular weight of the polyimine or polyamine, the people expert in the art can calculate the number of nitrogen atoms present in the molecule and, accordingly, the quantity of epoxide to be added in order to obtain the statistically fully epoxidized polyalkylene imine.

As noted hereinbefore, the dispersants are particularly useful for dispersing and milling particulate solids in an organic medium.

According a further aspect of the invention, there is provided a composition comprising a particulate solid and a dispersant of formula (1).

The dispersants of the invention can be used in accordance with the prior art for known dispersants, using the dispersants according to the invention in place of their prior art counterparts. Thus, for example, they can be used in the preparation of printing inks and inkjet inks, for conventional applications and for ceramic decorations, energy curable printing inks and energy curable inkjet inks, pigment- and/or filler-containing paints, pastes, pigment concentrates and/or moulding compositions. By way of example the dispersants can be used for preparing inkjet inks, in which case solvents, pigments and the dispersant, and customary auxiliaries are mixed. The dispersants of the invention are particularly suitable as well for inkjet inks containing ceramic pigments for decoration of ceramics, for example.

The solid present in the composition may be any inorganic or organic solid material which is substantially insoluble in the organic medium at the temperature concerned and which it is desired to stabilize in finely divided form therein. Examples of suitable solids are pigments for solvent inks, both conventional and for ink-jet inks; inorganic pigments for ceramic decorations; pigments, extenders and fillers for paints and plastic materials; dyes, for instance, disperse dyes; optical brightening agents and textile auxiliaries for solvent dye-bath, inks and other solvent application systems; solid for oil-based and invert-emulsion drilling muds; dirt and solid particles in dry cleaning fluids; particulate ceramic materials; magnetic materials and magnetic recording media; fire retardants such those used in plastics materials; biocides, agrochemicals and pharmaceuticals which are applied as dispersions in organic media.

As pigments are included any of the recognized classes of pigments described, for example, in the Third Edition of the Colour Index (1971) and the subsequent revisions of, and supplements thereto, under chapter headed "Pigments". The preferred pigments are inorganic pigments. Examples of inorganic pigments are titanium dioxide, zinc oxide, iron oxide, antimony oxide, chromium oxide, Prussian blue, cadmium sulphide, zinc sulphide, zinc phosphate, antimony sulphide, barium sulphate, lithopones, vermilion, ultramarine, manganese phosphate, cobalt aluminate, cobalt stannate, cobalt zincate and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes, carbon black, mixed metal oxides of nickel, titanium, zinc, manganese, cobalt, iron, chromium, antimony, magnesium, aluminium; any of the recognised classes of ceramic pigments used in ceramic decoration such as, for example, zirconates and/or silicates of Cr, Sn, Ni, Pr, Fe, Co and their oxides and/or those selected from ZrPr; ZrPrSi; Zr—Fe—Si; Ti—Cr—Sb; Co—Al—Zn; ZrVaSi; FeCrCoNi; CrCaSnSi; CoSi; and FeCrZn.

Examples of organic pigments are those from the azo, diazo, condensed azo, indigoid pigments, thioindigo, indanthrone, isoindanthrone, anthanthrone, anthraquinone, isodibenzanthrone, triphendioxazine, quinacridone and phthalocyanine series, and also lakes of acid, basic and mordant dyes. Other suitable solids include: extenders and fillers such as talc, kaolin, silica, barites and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, for instance, iron and chromium, e.g., gamma-$Fe_2O_3$, $Fe_3O_4$ and cobalt-doped iron oxides, calcium oxide, ferrites, such as, barium ferrites; and metal particles such as, metallic iron, nickel, cobalt and alloys thereof; agrochemicals such as fungicides flutriafen, carbendazim, chlorothalonil and mancozeb and fire retardants such as aluminum trihydrate and magnesium hydroxide.

The organic medium present in the compositions of the invention is preferably polar organic medium or substantially non-polar aliphatic or aromatic hydrocarbons or halogenated hydrocarbons, including mixtures thereof. Examples of suitable polar organic liquids are amines, ethers, organic acids, ketones, glycols, alcohols and amides. Examples of polar organic liquids are dialkyl ketones, alkyl esters of alkane carboxylic acids and alkanols up to a total of 6 carbon atoms. Suitable examples of organic liquids include dialkyl and cycloalkyl ketones such as acetone, methyl ethyl ketone, diethyl ketone, di isopropil ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol ethers and esters such as ethylene glycol, 2-ethoxyethanol, 3-methoxypropylpropanol, 3-ethoxypropylpropanol, polypropylene glycol, tripropylene glycol monomethyl ether (TPM), tripropylene glycol butyl ether (TPB), butyl glycol ether acetate, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol; dialkyl and cyclic ethers such as diethyl ether and tetrahydrofuran.

The substantially non-polar, organic liquids which may be used, either alone or in admixture with the aforementioned polar solvents are aromatic hydrocarbons, such as toluene and xylene and aliphatic hydrocarbons such as hexane, heptane, octane, decane, petroleum distillates such as white spirit, long chain aliphatic solvents such as isoparaffins, commercially available as ISOPAR products from Exxon Mobil and the corresponding products from British Petroleum and Total, dearomatized aliphatic hydrocarbons, commercially available as EXXSOL from Exxon Mobil and the corresponding products from Total, mineral oils, vegetable oils, and halogenated aliphatic such trichloro-ethylene, perchloroethylene and chlorobenzene and aromatic hydrocarbons such as 2-isopropylnaphthalene, 2,6-diisopropylnaphthalene.

In energy curable inks the organic liquids can be monomers or oligomers of (meth)acrylic acid or derivatives thereof, such as for example polyesteracrylates, polyether acrylates, polyurethanes acrylates.

Examples of polar resins, as the medium for the composition form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine/formaldehyde, long oil alkyd and multimedia resins such as acrylic and urea/aldehyde. The resin may also be unsaturated polyester resin including the so-called sheet molding compounds and bulk molding compounds which may be formulated with reinforcing fibers and fillers. Such molding compounds are described in DE 3,643,007 and the monograph by P. F. Bruins entitled "Unsaturated Polyester Technology", Gordon and Breach Science publishers, 1976, pages 211 to 238. If desired, the compositions may contain other ingredients, for example, resins (where these do not already constitute the organic medium), binders, fluidizing agents (such as those described in GB 1508576 and GB 2108143), anti-sedimentation agents, plasticizers, leveling agents and preservatives.

The compositions typically contain from 5 to 95% by weight of the solid, the precise quantity depending on the nature of the solid and the relative densities of the solid and the organic medium. In particular in ceramic ink-jet application, the ink preferably contains from 5 to 60% by weight of the pigment, the precise quantity depending on the nature of the pigment and on the relative densities of the pigment and the organic medium. Preferably the composition contains from 15 to 45% by weight of pigment.

The dispersants of the invention are generally used in an amount of 0.5% to 100% by weight, based on the solid to be dispersed. In order to disperse specific solids, however, higher amounts of the dispersants may also be necessary. The amount of dispersant is substantially dependent on the surface of the solid for dispersion that is to be coated. For example in inkjet inks for decoration of ceramics the content of dispersant can be used in amounts between 2 and 15% by weight, based on the total weight of the ink, preferably from 4 to 10% by weight.

The content of organic medium is between 30 and 80% by weight based on the total weight of the ink, preferably from 45 to 80% by weight.

The composition may be obtained by any of the conventional methods known for preparing dispersions. Thus the solid, the organic medium and the dispersant may be mixed in any order, the mixture then being subjected to a mechanical treatment to reduce the particles of the solid to an appropriate size, for example, by ball milling, bead milling, gravel milling, or three roll milling until a dispersion is formed. Alternatively, the solid may be treated to reduce its particle size independently or in admixture with either the organic medium or the dispersant, the other ingredient or ingredients then being added and the mixture being agitated to provide a dispersion.

When the pigment is milled in the presence of dispersant and organic liquid the temperature is preferably not greater than 40° C. and especially not greater than 30° C.

In particular in inks for ink-jet decoration of ceramics, the average particle size of is between 0.1 and 0.8 μm, prepared by milling inorganic pigments having initial average particle size between 1.0 and 10.0 μm. The ink viscosity is between 5 and 50 mPa·s and preferably between 8 and 30 mPa·s.

Compositions containing the dispersants of the invention are particularly suitable for use in paints, especially high solid paints, inks both conventional and energy curable, especially flexographic, gravure, screen, offset and ink-jet inks, especially inkjet inks for decoration of ceramics and non-aqueous ceramic processes, especially tape-coating, doctor-blade, extrusion and injection molding type processes.

The invention is illustrated but not limited by the following Examples in which all parts and percentages are by weight unless otherwise indicated.

EXAMPLES

Intermediates

Preparation of Intermediate 1

978 parts of LUPASOL WF (polyetheyleneimine from BASF having MW-25,000) were charged in a stirred autoclave. Once the autoclave has been evacuated three times and purged with nitrogen to remove all traces of oxygen, the temperature was raised to 120° C.

1,330 parts of propylene oxide were gradually added, while keeping the temperature between 120 and 125° C. and the pressure between 2 and 4 bar. At the end of the propylene oxide addition, the mixture was left at 120-125° C. for one additional hour in order to complete the reaction. The autoclave was then cooled down to room temperature. The final product was a high viscous liquid, with an amine number of 460 mg KOH/g Preparation of Intermediate 2

A mixture of 722.3 parts of ricinoleic acid, 275.7 parts of ε-caprolactone and 2.0 parts of dibutyl tin dilaurate was stirred, under nitrogen, and heated at 170° C. for 8 hours removing the esterification water. The final product was an oily liquid with an acid value of 50.1 mg KOH/g.

Preparation of Intermediate 3

A mixture of 483.5 parts of ricinoleic acid and 182.5 parts of a 80% aqueous solution of lactic acid was stirred, under nitrogen, and heated to 100° C.; vacuum was gradually applied to remove the lactic acid dilution water. The temperature was decreased to 60° C. and 0.6 parts of dibutyl tin dilaurate were added; the mixture was heated at 170° C. for 13 hours removing the esterification water. The final product was an oily liquid with an acid value of 52.2 mg KOH/g.

Preparation of Intermediate 4

A mixture of 202.5 parts of 12-hydroxystearic acid, 75.6 parts of ε-caprolactone and 0.55 parts of dibutyl tin dilaurate was stirred, under nitrogen, and heated at 170° C. for 8 hours removing the esterification water. The final product was an oily liquid with an acid value of 50.8 mg KOH/g.

Preparation of Dispersant A

A mixture of 278.1 parts of Intermediate 2 and 21.8 parts of Intermediate 1 was stirred, under nitrogen, and heated to 120° C. for 2 hours. The dispersant was obtained as a viscous liquid with an acid value of 43.1 mg KOH/g.

Preparation of Dispersant B

A mixture of 278.1 parts of Intermediate 2 and 21.8 parts of Intermediate 1 was stirred, under nitrogen, and heated to 200° C. for 7 hours removing the esterification water. The dispersant was obtained as a viscous liquid with an acid value of 7.3 mg KOH/g.

Preparation of Dispersant C

A mixture of 182.6 parts of Intermediate 3 and 17.4 parts of Intermediate 1 was stirred, under nitrogen, and heated to 200° C. for 5 hours removing the esterification water. The dispersant was obtained as a viscous liquid with an acid value of 7.0 mg KOH/g.

Preparation of Dispersant D

A mixture of 126.0 parts of Intermediate 2 and 24.0 parts of Intermediate 1 was stirred, under nitrogen, and heated to 200° C. for 5 hours removing the esterification water. The dispersant was obtained as a viscous liquid with an acid value of 4.5 mg KOH/g.

Preparation of Dispersant E (comparative)

A mixture of 228.0 parts of Intermediate 2 and 17.9 parts of LUPASOL WF (polyethylenimine frome BASF having MW=25,000) was stirred, under nitrogen, and heated to 120° C. for 2 hours. The dispersant was obtained as a high viscous liquid with an acid value of 35.9 mg KOH/g.

Preparation of Dispersant F (comparative, according to U.S. Pat. No. 5,700,395)

A mixture of 228.0 parts of Intermediate 2 and 17.9 parts of LUPASOL WF(polyethylenimine frome BASF having MW=25,000) was stirred, under nitrogen, and heated to 170° C. for 6 hours, removing the amidation water. The dispersant was obtained as a high viscous liquid with an acid value of 13.3 mg KOH/g.

Preparation of Dispersant G (comparative)

A mixture of 481.0 parts of Intermediate 2 and 19.0 parts of LUPASOL WF (polyethylenimine frome BASF having MW=25,000) was stirred, under nitrogen, and heated to 120° C. for 2 hours. The dispersant was obtained as a high viscous liquid with an acid value of 39.1 mg KOH/g.

Preparation of Dispersant H (comparative)

A mixture of 481.0 parts of Intermediate 2 and 19.0 parts of LUPASOL WF (polyethylenimine frome BASF having MW=25,000) was stirred, under nitrogen, and heated to 170° C. for 6 hours, removing the amidation water. The dispersant was obtained as a high viscous liquid with an acid value of 16.3 mg KOH/g.

Preparation of the Ceramic Inkjet Inks

Eight ceramic inkjet inks were prepared, by using in each a different dispersant. 7.8 g of dispersant are stirred and dissolved it in 89.7 g of Dowanol TPM (tripropylene glycol methyl ether) in 5 minutes.

52.5 g of blue pigment of cobalt silicoaluminate are added and mixed for 5 minutes.

The blue pigment has $d_{50}$=2.0 µm, measured by particle size analysis (Malvern Instruments Mastersizer 2000).

200 g of grinding media (YTZ® Grinding Media 0.3 mm, made of Yttrium Stabilized Zirconia Grinding Beads, produced by Nikkato Corporation) and 60 g of the mixture prepared as described above are charged in a 125 ml grinding jar and milled in a planetary ball mill (PM 200 produced by Retsch).

All the inks prepared with the dispersants of the invention showed a viscosity at 35° C. lower than 30 mPa·s.

The dispersants prepared in the preceding Examples were evaluated by measuring their solubility in Dowanol TPM, the particle size of the pigment (measured as $d_{50}$) after a milling time of 3 hours, the stability of the corresponding ceramic inkjet ink was checked after 7 and 10 days storage at room temperature.

Solubility was determined at 20° C. at 8% by weight in Dowanol TPM after stirring with a magnetic stirrer for 5 minutes.

The results are reported in Table 1

TABLE 1

| | Solubility | |
|---|---|---|
| Dispersant | Medium | After 5' |
| Dispersant A | TPM | soluble |
| Dispersant B | TPM | soluble |
| Dispersant C | TPM | soluble |
| Dispersant D | TPM | soluble |
| Dispersant E * | TPM | soluble |
| Dispersant F * | TPM | soluble |
| Dispersant G * | TPM | soluble |
| Dispersant H * | TPM | soluble |

* comparative

The particle size after milling ($d_{50}$) is reported in Table 2.

Particle size analysis has been performed by using a Malvern Instruments Mastersizer 2000

Stability was determined by storing the ceramic inkjet inks at room temperature for 7 days and 10 days and by visually checking the homogeneity of the samples (H) or the separation of liquid phases (S).

The results are reported in Table 3.

From the results reported in Tables 1 and 2 the dispersants of the invention are soluble in the organic medium and their use in millbased ink preparations give compositions that have particle size distributions suitable for ink-jet decoration of ceramics. Moreover the dispersants of the invention give millbased inks that have superior stability in comparison with the dispersants prepared from not alkoxylated polyetylenimine.

TABLE 2

| Particle size | |
|---|---|
| Dispersant in the ink | $d_{50}$ (µm) |
| Dispersant A | 0.266 |
| Dispersant B | 0.222 |
| Dispersant C | 0.268 |
| Dispersant D | 0.294 |
| Dispersant E * | 0.234 |
| Dispersant F * | 0.231 |
| Dispersant G * | 0.228 |
| Dispersant H * | 0.246 |

* comparative

TABLE 3

| | Stability | |
|---|---|---|
| Dispersant | Stability after 7 days | Stability after 10 days |
| Dispersant A | H | H |
| Dispersant B | H | H |
| Dispersant C | H | H |
| Dispersant D | H | H |
| Dispersant E* | H | S |
| Dispersant F* | H | S |
| Dispersant G* | H | S |
| Dispersant H* | H | S |

*comparative

The invention claimed is:

1. A chemical compound having a general formula:

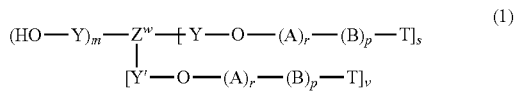

(1)

wherein:
$Z^w$ is an organic radical comprising w amino groups and w is a number such that 5<w<3,000;
A and B are independently oxy-$C_1$-$C_{20}$-alkylene carbonyl groups or oxy-$C_2$-$C_{20}$-alkenylene carbonyl groups derived from hydroxy carboxylic acids or lactones;
T is hydrogen or R—CO—, where R is a $C_1$-$C_{50}$ hydrocarbyl group;
Y is a $C_3$-$C_4$ alkylene radical linked to an amino group of $Z^w$;
Y' is an ionic salt link formed from the salification of the carboxylic acid group of the polyester HO-(A)$_r$-(B)$_p$-T with an amino group of $Z^w$;
r and p are independently numbers of between 0 and 50 and r+p>2; and
s, m and v are numbers such that 0.99w≤s+m<2w, and 0.3w≤s+v<2w.

2. The chemical compound of claim 1 wherein the organic radical $Z^w$ is the residue of a polyethyleneimine.

3. The chemical compound of claim 2 wherein the organic radical $Z^w$ is the residue of polyethyleneimine having a number molecular weight of from about 500 to about 60,000.

4. The chemical compound of claim 2 wherein Y is —(CH$_3$)CH—CH$_2$—.

5. The chemical compound of claim 1 wherein r+p>3.

6. The chemical compound of claim 1 wherein 0.5w≤s+v<w+2.

7. The chemical compound of claim 1 wherein $0.99w \leq s+m<1.2 w$.

8. The chemical compound of claim 4 wherein $s=0$.

9. A liquid composition comprising from about 5 to about 95% by weight of a particulate solid and from about 0.5% to about 100% by weight based on the particulate solid of a chemical compound having a general formula:

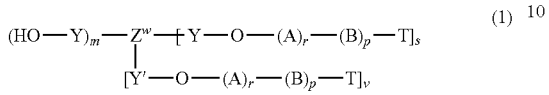     (1)

wherein:
- $Z^w$ is an organic radical comprising w amino groups and w is a number such that $5<w<3,000$;
- A and B are independently oxy-$C_1$-$C_{20}$-alkylene carbonyl groups or oxy-$C_2$-$C_{20}$-alkenylene carbonyl groups derived from hydroxy carboxylic acids or lactones;
- T is hydrogen or R—CO—, where R is a $C_1$-$C_{50}$ hydrocarbyl group;
- Y is a $C_3$-$C_4$ alkylene radical linked to an amino group of $Z^w$;
- Y' is an ionic salt link formed from the salification of the carboxylic acid group of the polyester HO-$(A)_r$-$(B)_p$-T with an amino group of $Z^w$;
- r and p are independently numbers of between 0 and 50 and $r+p>2$; and
- s, m and v are numbers; such that $0.99w \leq s+m<2w$, and $0.3w \leq s+v<2w$.

10. The liquid composition of claim 9 wherein the particulate solid is an inorganic pigment.

11. The liquid composition of claim 9 wherein the particulate solid is a ceramic pigment.

12. The liquid composition of claim 11 wherein the chemical compound comprises:
from about 5 to about 60% by weight of ceramic pigment, and
from about 2 to about 15% by weight based on the ceramic pigment of a chemical compound having a general formula:

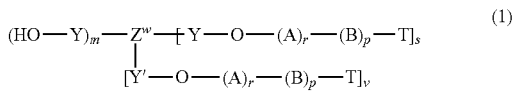     (1)

wherein:
- $Z^w$ is an organic radical comprising w amino groups, in which w is a number such that $5<w<3,000$;
- A and B are independently oxy-$C_1$-$C_{20}$-alkylene carbonyl groups or oxy-$C_2$-$C_{20}$-alkenylene carbonyl groups derived from hydroxy carboxylic acids or lactones;
- T is hydrogen or R—CO—, where R is a $C_1$-$C_{50}$ hydrocarbyl group;
- Y is a $C_3$-$C_4$ alkylene radical linked to an amino group of $Z^w$;
- Y' is an ionic salt link formed from the salification of the carboxylic acid group of the polyester HO-$(A)_r$-$(B)_p$-T with an amino group of $Z^w$;
- r and p are independently numbers of between 0 and 50 and $r+p>2$;
- s, m and v are numbers such that $0.99w \leq s+m<2w$, and $0.3w \leq s+v<2w$; and
- the chemical compound has a viscosity of between about 5 and about 50 mPa·s.

13. The liquid composition of claim 12 wherein the chemical compound comprises:
from 15 to 45% by weight of ceramic pigment, and
from 4 to 10% by weight based on the ceramic pigment of a chemical compound having a general formula:

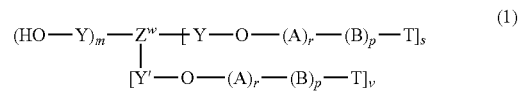     (1)

wherein:
- $Z^w$ is an organic radical comprising w amino groups, in which w is a number such that $5<w<3,000$;
- A and B are independently oxy-$C_1$-$C_{20}$-alkylene carbonyl groups or oxy-$C_2$-$C_{20}$-alkenylene carbonyl groups derived from hydroxy carboxylic acids or lactones;
- T is hydrogen or R—CO—, where R is a $C_1$-$C_{50}$ hydrocarbyl group;
- Y is a $C_3$-$C_4$ alkylene radical linked to an amino group of $Z^w$;
- Y' is an ionic salt link formed from the salification of the carboxylic acid group of the polyester HO-$(A)_r$-$(B)_p$-T with an amino group of $Z^w$;
- r and p are independently numbers of between 0 and 50 and $r+p>2$;
- s, m and v are numbers; such that $0.99w \leq s+m<2w$, and $0.3w \leq s+v<2w$; and
- the chemical compound has a viscosity between about 8 and about 30 mPa·s.

14. The liquid composition of claim 9 wherein the organic radical $Z^w$ is the residue of a polyethyleneimine.

15. The liquid composition of claim 14 wherein the organic radical $Z^w$ is the residue of polyethyleneimine having a number molecular weight of from about 500 to about 60,000.

16. The liquid composition of claim 14 wherein Y is —(CH$_3$)CH—CH$_2$—.

17. The liquid composition of claim 14 wherein $r+p>3$.

18. The liquid composition of claim 14 wherein $0.5w \leq s+v<w+2$.

19. The liquid composition of claim 14 wherein $0.99w \leq s+m<1.2 w$.

20. A chemical compound having a general formula:

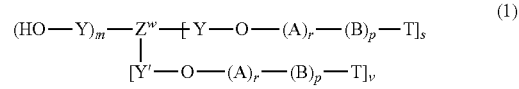     (1)

wherein:
- $Z^w$ is an organic radical residue of a polyethyleneimine comprising w amino groups and w is a number such that $5<w<3,000$;
- A and B are independently oxy-$C_1$-$C_{20}$-alkylene carbonyl groups or oxy-$C_2$-$C_{20}$-alkenylene carbonyl groups derived from hydroxy carboxylic acids or lactones;
- T is hydrogen or R—CO—, where R is a $C_1$-$C_{50}$ hydrocarbyl group;

Y is a $-(CH_3)CH-CH_2-$ radical linked to an amino group of $Z^w$;

Y' is an ionic salt link formed from the salification of the carboxylic acid group of the polyester HO-$(A)_r$-$(B)_p$-T with an amino group of $Z^w$;

r and p are independently numbers of between 0 and 50 and r+p>2;

s and m are numbers; such that $0.99w<s+m<2w$; and $0.3w<s+v<2w$; and v=0.

* * * * *